(12) United States Patent
Stefansson

(10) Patent No.: US 9,135,065 B1
(45) Date of Patent: Sep. 15, 2015

(54) PARALLEL PROCESSING OF MULTIDIMENSIONAL ARRAYS

(75) Inventor: Halldor Narfi Stefansson, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 65 days.

(21) Appl. No.: 13/599,020

(22) Filed: Aug. 30, 2012

Related U.S. Application Data

(60) Provisional application No. 61/529,736, filed on Aug. 31, 2011, provisional application No. 61/656,262, filed on Jun. 6, 2012.

(51) Int. Cl.
*G06F 9/46* (2006.01)
*G06F 9/50* (2006.01)

(52) U.S. Cl.
CPC .......................................... *G06F 9/50* (2013.01)

(58) Field of Classification Search
USPC .......................................................... 718/102
See application file for complete search history.

(56) References Cited

U.S. PATENT DOCUMENTS

2008/0201721 A1* 8/2008 Little et al. ............... 718/106
2010/0023728 A1* 1/2010 El-Mahdy et al. ........... 712/12

OTHER PUBLICATIONS

MathLab1, MATLAB V7 Function Reference: vol. 1 (A-E) Section Arrayfun, Dec. 15, 1996, The MathWorks, Inc., p. 2-219.*
MathLab2, Creating Multidimensional Arrays, 2005, The MathWorks, Inc., p. 3.*
MathLab3, MATLAB V7 Function Reference: vol. 1 (A-E) Section Functions—by Category, Dec. 15, 1996, The MathWorks, Inc., p. 1-30.*
University of British Columbia, Speedup tricks Section bsxfun, Sep. 21, 2008.*
MATLAB Function Reference Arithmetic Operators +−*+−*/\^', A', Feb. 1, 2001, http://nf.ncl.org.au.
Co-pending U.S. Appl. No. 14/060,114 entitled "Parallel Processing of Multidimensional Arrays" by Stefansson, filed Oct. 22, 2013, 70 pages.
Tursa, "MTIMESX—Fast Matrix Multiply with Multi-Dimensional Support", Matlab® Central, Nov. 30, 2009, 19 pages.
Wiki, "GFOR", http://wiki.accelereyes.com/wiki/index/php/GFOR, May 27, 2010, 3 pages.
"ppeval: Description & requirements", http://www.neuroimaging.org.au/twiki/pub/Soma/AppsStarpDoc/ppeval.pdf, Apr. 10, 2007, 7 pages.

* cited by examiner

*Primary Examiner* — Emerson Puente
*Assistant Examiner* — Steven Do
(74) *Attorney, Agent, or Firm* — Harrity & Harrity, LLP

(57) ABSTRACT

A device receives a command to initiate parallel processing. The command includes an indication of a function that is to be performed in connection with the parallel processing, and a reference to a multidimensional array to which the function is to be applied. The multidimensional array includes at least three dimensions. The command also includes an indication of one or more dimensions by which the multidimensional array is to be partitioned. The device partitions the multidimensional array, along the one or more dimensions, to divide the multidimensional array into multiple blocks, each of the multiple blocks representing a subset of the multidimensional array. The device controls application of the function to the multiple blocks to cause the function to be applied in parallel to at least two blocks of the multiple blocks.

21 Claims, 13 Drawing Sheets

FIG. 8

| Thread Block | Elements read in a | Elements read in b | Elements read in c | Elements written to in D |
|---|---|---|---|---|
| 1 | a(1:32) | b(1:32) | c(1:32) | D(1:32, 1:32, 1:32) |
| 2 | a(33:64) | b(1:32) | c(1:32) | D(33:64, 1:32, 1:32) |
| 3 | a(1:32) | b(33:64) | c(1:32) | D(1:32, 33:64, 1:32) |
| 4 | a(33:64) | b(33:64) | c(1:32) | D(33:64, 33:64, 1:32) |
| 5 | a(1:32) | b(1:32) | c(33:64) | D(1:32, 1:32, 33:64) |
| 6 | a(33:64) | b(1:32) | c(33:64) | D(33:64, 1:32, 33:64) |
| 7 | a(1:32) | b(33:64) | c(33:64) | D(1:32, 33:64, 33:64) |
| 8 | a(33:64) | b(33:64) | c(33:64) | D(33:64, 33:64, 33:64) |

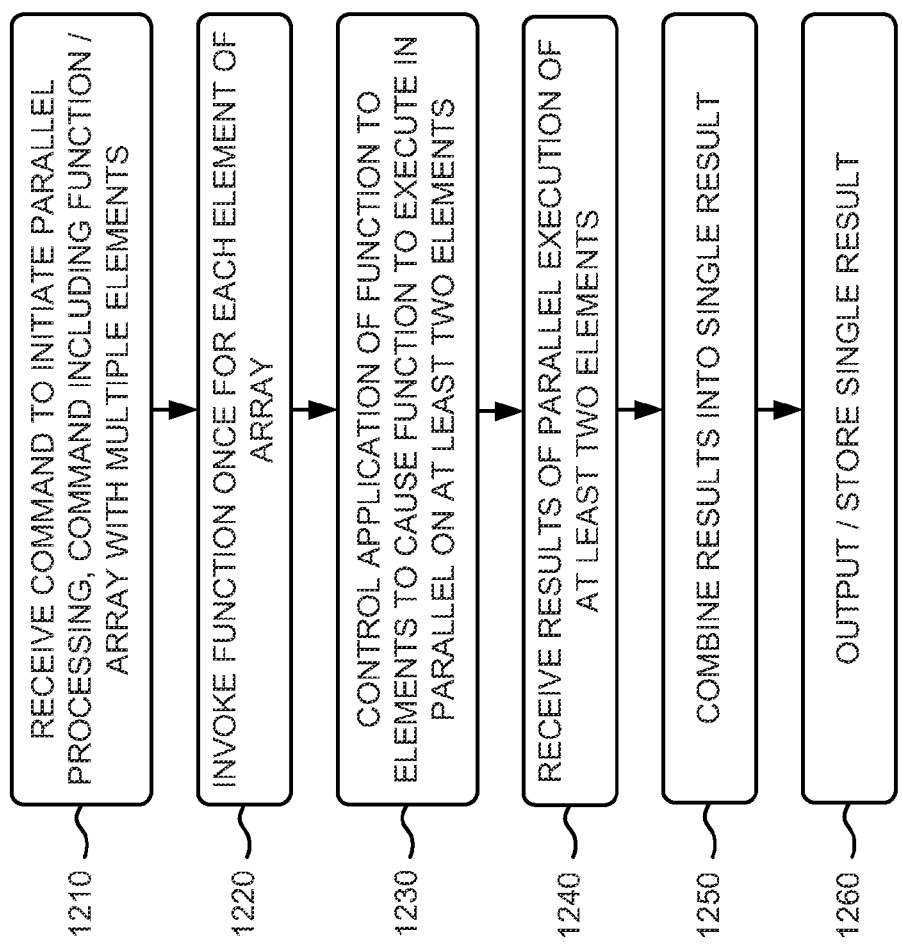

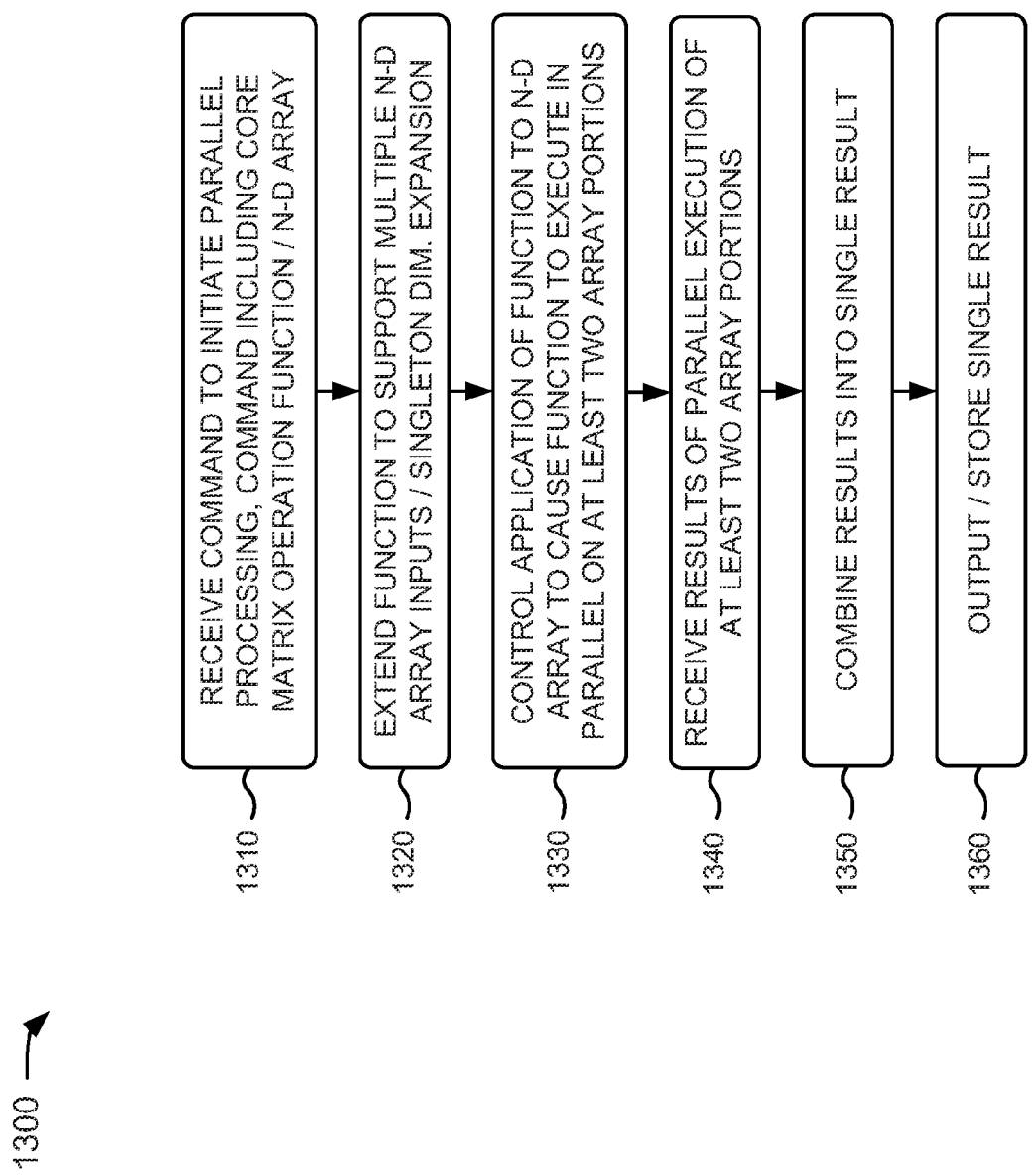

PARALLEL PROCESSING OF MULTIDIMENSIONAL ARRAYS

RELATED APPLICATION

This application claims priority under 35 U.S.C. §119 based on U.S. Provisional Patent Application No. 61/529,736, filed Aug. 31, 2011, and U.S. Provisional Patent Application No. 61/656,262, filed Jun. 6, 2012, the disclosures of which are incorporated by reference herein in their entireties.

BRIEF DESCRIPTION OF THE DRAWINGS

The accompanying drawings, which are incorporated in and constitute a part of this specification, illustrate one or more implementations and, together with the description, explain these implementations. In the drawings:

FIG. 8 is a table depicting a solution generated by the array extension operations shown in FIG. 7;

FIG. 12 is a flow chart of an example process for parallel processing elements of a multidimensional array; and FIG. 13 is a flow chart of an example process for parallel processing of a multidimensional array using core matrix operations.

DETAILED DESCRIPTION

The following detailed description refers to the accompanying drawings. The same reference numbers in different drawings may identify the same or similar elements.

A technical computing environment (TCE) may include a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. The TCE may use an array, a vector, and/or a matrix as basic elements. Users of a TCE may find it difficult to efficiently execute code that involves computations with multiple small vectors and/or matrices. When executed one at a time, operations with small vectors and/or matrices may provide little opportunity for multi-threaded or parallel execution. Furthermore, TCE users often need to write code that involves performing the same processing on different portions of an array. Typically, the TCE users utilize for loops in order to achieve this. Unfortunately, performing for loop indexing may be prone to errors which may result in the for loop executing serially.

Overview

Systems and/or methods described herein may enable a TCE to re-write code so that operations with small vectors and/or matrices may be executed concurrently. This may enable the TCE to perform multi-threaded or parallel execution of the operations. Alternatively, or additionally, the systems and/or methods may enable the TCE to express for loops using an equivalent syntax that executes the resulting code efficiently, in terms of memory usage and time, and on a central processing unit (CPU) and a graphical processing unit (GPU). This may permit TCE users to efficiently execute problems involving a large number of small arrays, and to implement algorithms for GPU arrays without requiring the TCE users to write compute unified device architecture (CUDA) code. This may also permit TCE users to implement algorithms for distributed arrays without requiring the TCE users to understand an underlying distribution scheme and a structure of local parts.

Figure 1:
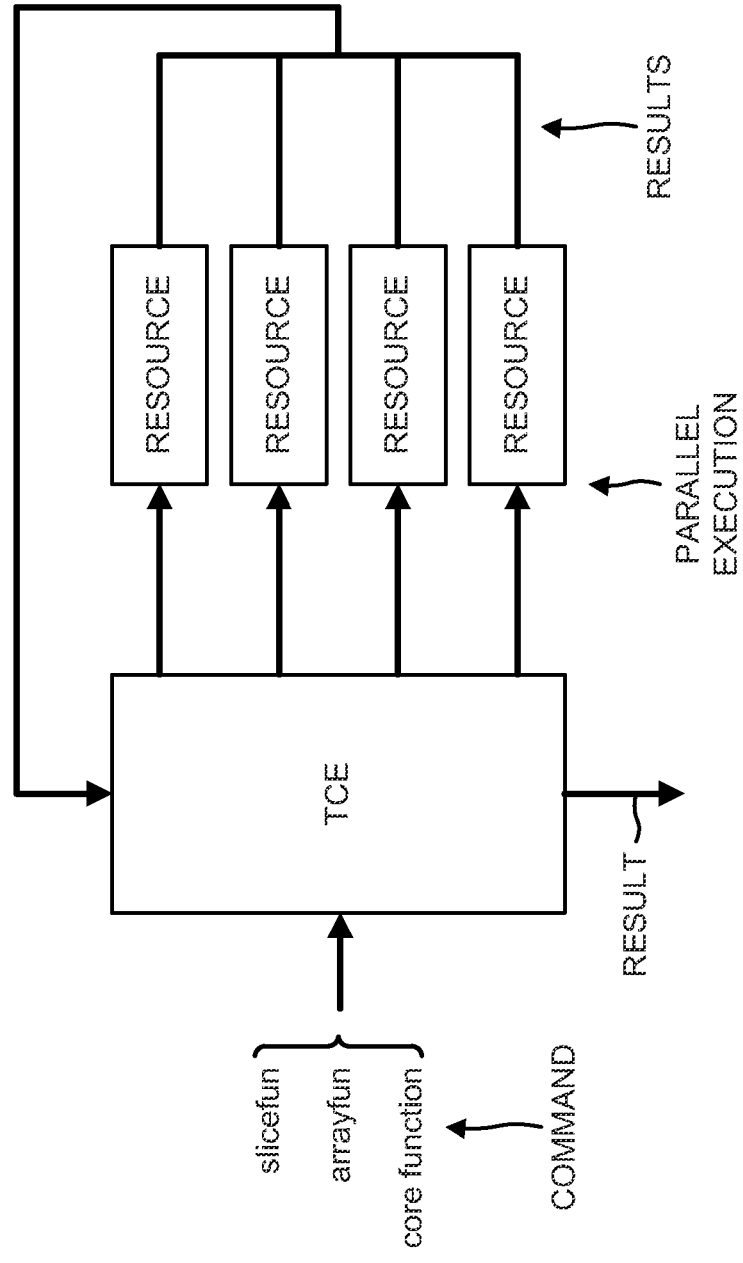
FIG. 1 is a diagram of an overview of an example implementation described herein.

FIG. 1 is a diagram of an overview of an example implementation described herein. As shown in FIG. 1, a technical computing environment (TCE) may receive a command to initiate parallel processing. In one example, the command (e.g., slicefun) may include a function (e.g., fun) to be performed in connection with the parallel processing, a reference to a multidimensional array, and an indication of one or more dimensions by which the multidimensional array is to be partitioned. Based on the slicefun command, the TCE may partition the array along the one or more dimensions to create multiple blocks of the array. The TCE may control application of the function fun to the multiple blocks so that two or more of the blocks are executed in parallel by two or more resources. Each resource may include a hardware resource or a software resource of a device or a group of devices. For example, a hardware resource may include a memory device, a CPU, a GPU, a core of a CPU or GPU, etc. A software resource may include a socket, a thread, a semaphore, an inter-process communications (IPC) mechanism, etc.

The two or more resources may concurrently execute the function fun on the two or more blocks to generate two or more results. In one example, each of the two or more results may include a portion of an output array. The resources may provide the two or more results to the TCE, and the TCE may receive the two or more results. The TCE may combine the two or more results into a single result (e.g., an output array), and may store and/or output the two or more results and/or the single result.

Alternatively, or additionally, the command (e.g., arrayfun) may include a function (e.g., fun) to be performed in connection with the parallel processing, and an array with multiple elements. Based on the arrayfun command, the TCE may invoke the function fun once for each element of the array, and may control application of the function fun to the multiple elements so that two or more of the elements are executed in parallel by the two or more resources. The two or more resources may concurrently execute the function fun on the two or more elements to generate two or more results. In one example, each of the two or more results may include an element of an output array. The resources may provide the two or more results to the TCE, and the TCE may receive the two or more results. The TCE may combine the two or more results into a single result (e.g., an output array), and may store and/or output the two or more results and/or the single result.

Alternatively, or additionally, the command may include a function (e.g., a core matrix operation) to be performed in connection with the parallel processing, and an N-dimensional (N-D) array (e.g., where N≥2). Based on the command, the TCE may extend the function to support multiple N-D array inputs and singleton dimension (e.g., a dimension with a size of one) expansion. The TCE may control application of the function to the N-D array so that two or more portions of the N-D array are executed in parallel by the two or more resources. The two or more resources may concurrently execute the function on the two or more portions of the N-D array to generate two or more results. In one example, each of the two or more results may include a portion of an output array. The resources may provide the two or more results to the TCE, and the TCE may receive the two or more results. The TCE may combine the two or more results into a single result (e.g., an output array), and may store and/or output the two or more results and/or the single result.

As used herein, the term "parallel processing," may include any type of processing that can be distributed across two or more resources and be performed at substantially the same time. For example, in one implementation, parallel processing may refer to task parallel processing where a number of tasks are processed at substantially the same time on a number of resources. In task parallel processing, each task may be processed independently of other tasks executing at the same time (e.g., a first resource executing a first task may not communicate with a second resource executing a second task). Alternatively, or additionally, parallel processing may refer to data parallel processing, where data (e.g., a data set) is parsed into a number of portions that are executed in parallel using two or more software units of execution. In data parallel processing, the resources and/or the data portions may communicate with each other as processing progresses.

Alternatively, or additionally, parallel processing may refer to stream parallel processing (also referred to as pipeline parallel processing). Stream parallel processing may use a number of resources arranged in series (e.g., a line) where a first resource produces a first result that is fed to a second resource that produces a second result. Stream parallel processing may also include a state where task allocation may be expressed in a directed acyclic graph (DAG) or a cyclic graph with delays. Other implementations may combine two or more of task, data, or stream parallel processing techniques alone or with other types of processing techniques to form hybrid-parallel processing techniques.

Example Environment Arrangement

Figure 2:
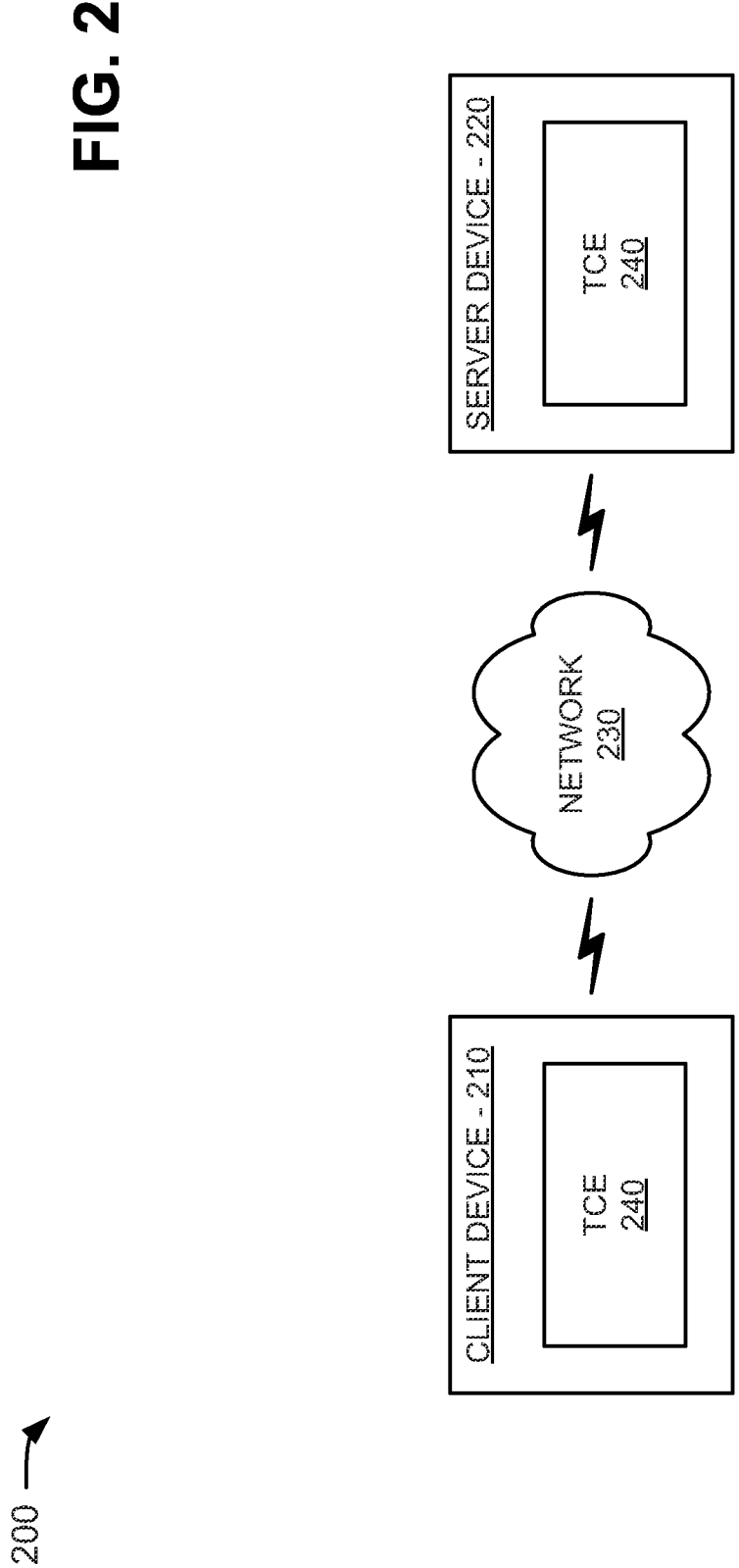
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections. A single client device 210, server device 220, and network 230 have been illustrated in FIG. 2 for simplicity. In practice, environment 200 may include more client devices 210, server devices 220, and/or networks 230. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, central processing units (CPUs), graphical processing units (GPUs), application-specific integrated circuits (ASICs), field-programmable gate arrays (FPGAs), etc. and/or software (e.g., a simulator) executing on the aforementioned devices. In one example, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int=([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int=([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in other implementations, environment 200 may include fewer components, different components, differently arranged components, and/or additional components than those depicted in FIG. 2. Alternatively, or additionally, one or more components of environment 200 may perform one or more other tasks described as being performed by one or more other components of environment 200.

Example Device Architecture

Figure 3:
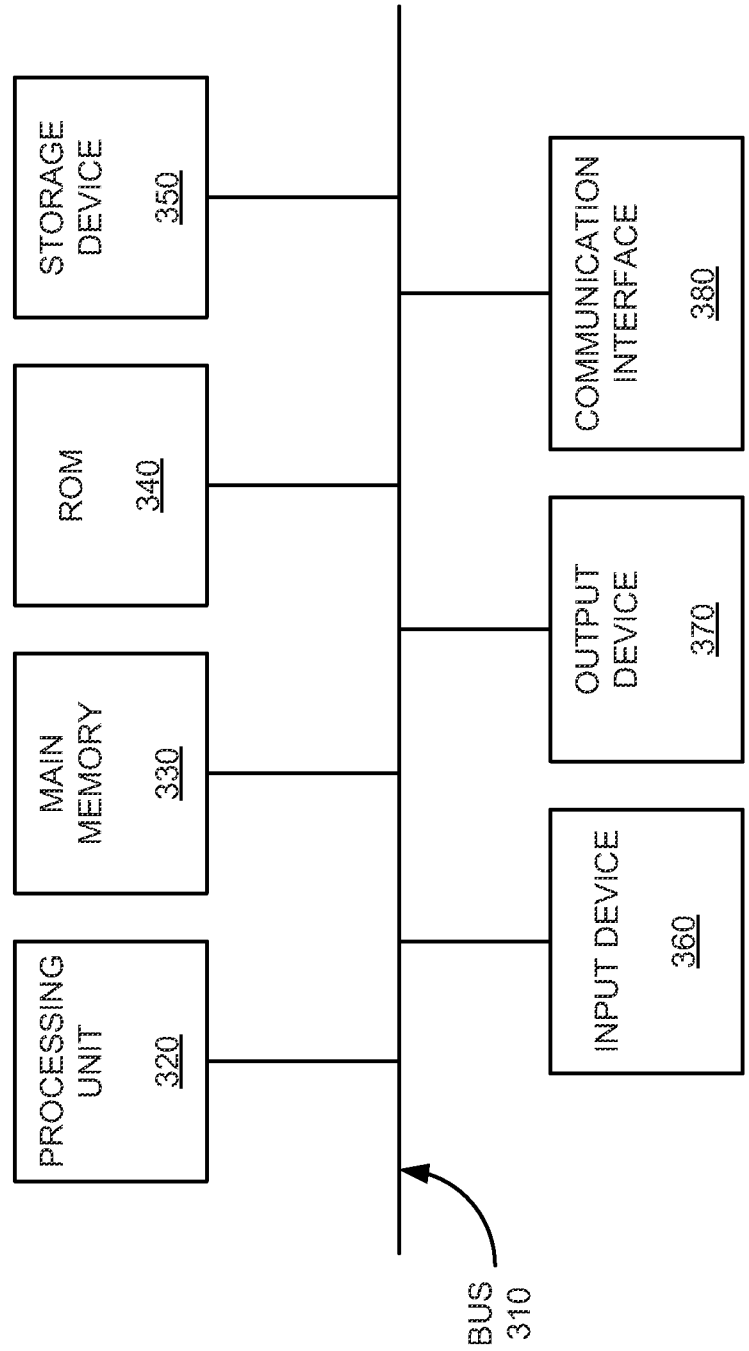
FIG. 3 is a diagram of example components of one or more of the devices of the environment depicted in FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Technical Computing Environment

Figure 4:
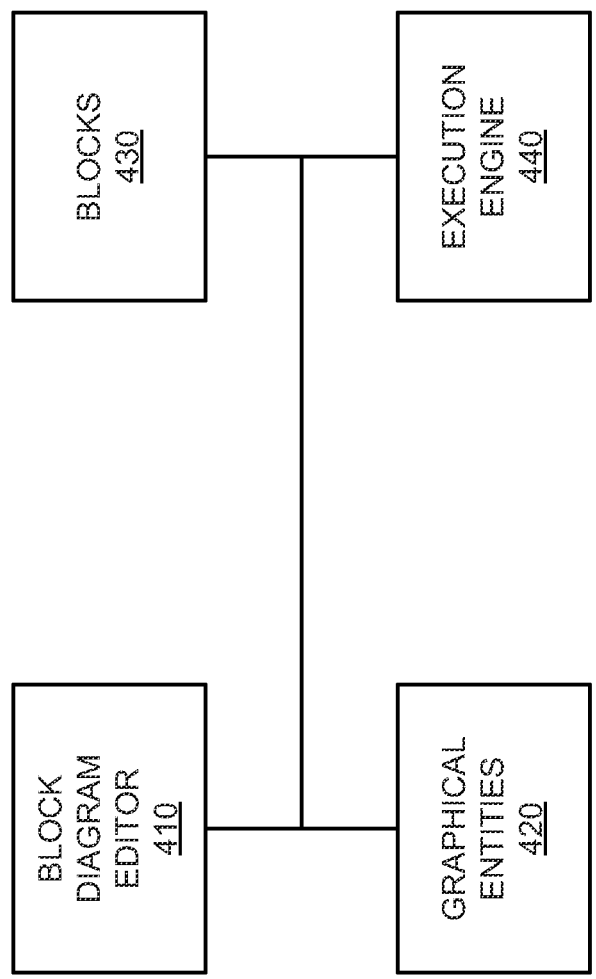
FIG. 4 is a diagram of example functional components of a technical computing environment (TCE) that may be used by one or more of the devices of the environment depicted in FIG. 2.

FIG. 4 is a diagram of example functional components of TCE 240. In one implementation, the functions described in connection with FIG. 4 may be performed by one or more components of device 300 (FIG. 3) and/or by one or more devices 300. As shown in FIG. 4, TCE 240 may include a block diagram editor 410, graphical entities 420, blocks 430, and/or an execution engine 440.

Block diagram editor 410 may include hardware or a combination of hardware and software that may be used to graphically specify models of dynamic systems. In one implementation, block diagram editor 410 may permit a user to perform actions, such as construct, edit, display, annotate, save, and/or print a graphical model (e.g., a block diagram that visually and/or pictorially represents a dynamic system). In another implementation, block diagram editor 410 may permit a user to create and/or store data relating to graphical entities 420.

A textual interface may be provided to permit interaction with block diagram editor 410. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 420 may include hardware or a combination of hardware and software that may provide entities (e.g., signal lines, buses, etc.) that represent how data may be communicated between functional and/or non-functional units and blocks 430 of a model. Blocks 430 may include fundamental mathematical elements of a block diagram model.

Execution engine 440 may include hardware or a combination of hardware and software that may process a graphical model to produce simulation results, may convert the graphical model into executable code, and/or may perform other analyses and/or related tasks. In one implementation, for a block diagram graphical model, execution engine 440 may translate the block diagram into executable entities (e.g., units of execution) following the layout of the block diagram. The executable entities may be compiled and/or executed on a device (e.g., client device 210) to implement the functionality specified by the model.

Graphical models may include entities with relationships between the entities, and the relationships and/or the entities may have attributes associated with them. The entities my include model elements such as blocks 430 and ports. The relationships may include model elements such as lines (e.g., connector lines) and references. The attributes may include model elements such as value information and meta information for the model element associated with the attributes. Graphical models may be associated with configuration information. The configuration information may include information for the graphical model such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks (e.g., blocks 430) connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks (e.g., blocks 430). A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks (e.g., blocks 430) may be causal and/or non-causal. For example, a model may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

A sample time may be associated with the elements of a graphical model. For example, a graphical model may include a block (e.g., block 430) with a continuous sample time such as a continuous-time integration block that may integrate an input value as time of execution progresses. This integration may be specified by a differential equation. During execution the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block (e.g., block 430) with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block (e.g., block 430) with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. For example, the graphical model may include a block (e.g., block 430), such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks (e.g., blocks 430) where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristics settings, such as one or more inherited settings, one or more default settings, etc. For example, the data type of a variable that is associated with a block (e.g., block 430) may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

In one example implementation, TCE 240 may include a code generator that can generate code from a model. The code generator may receive code in a first format and may transform the code from the first format into a second format. The code generator may generate source code, assembly language code, binary code, interface information, configuration information, performance information, etc., from at least a portion of a graphical model.

For example, the code generator may generate C, C++, SystemC, Java, etc., from the graphical model. Alternatively, or additionally, the code generator may further generate Unified Modeling Language (UML) based representations and/or extensions from some or all of a graphical model (e.g., System Modeling Language (SysML), Extensible Markup Language (XML), Modeling and Analysis of Real Time and Embedded Systems (MARTE), Hardware Description Language (HDL), Automotive Open System Architecture (AUTOSAR), etc.).

Although FIG. 4 shows example functional components of TCE 240, in other implementations, TCE 240 may include fewer functional components, different functional components, differently arranged functional components, and/or additional functional components than depicted in FIG. 4. Alternatively, or additionally, one or more functional components of TCE 240 may perform one or more other tasks described as being performed by one or more other functional components of TCE 240.

Example Technical Computing Environment Operations

Figure 5:
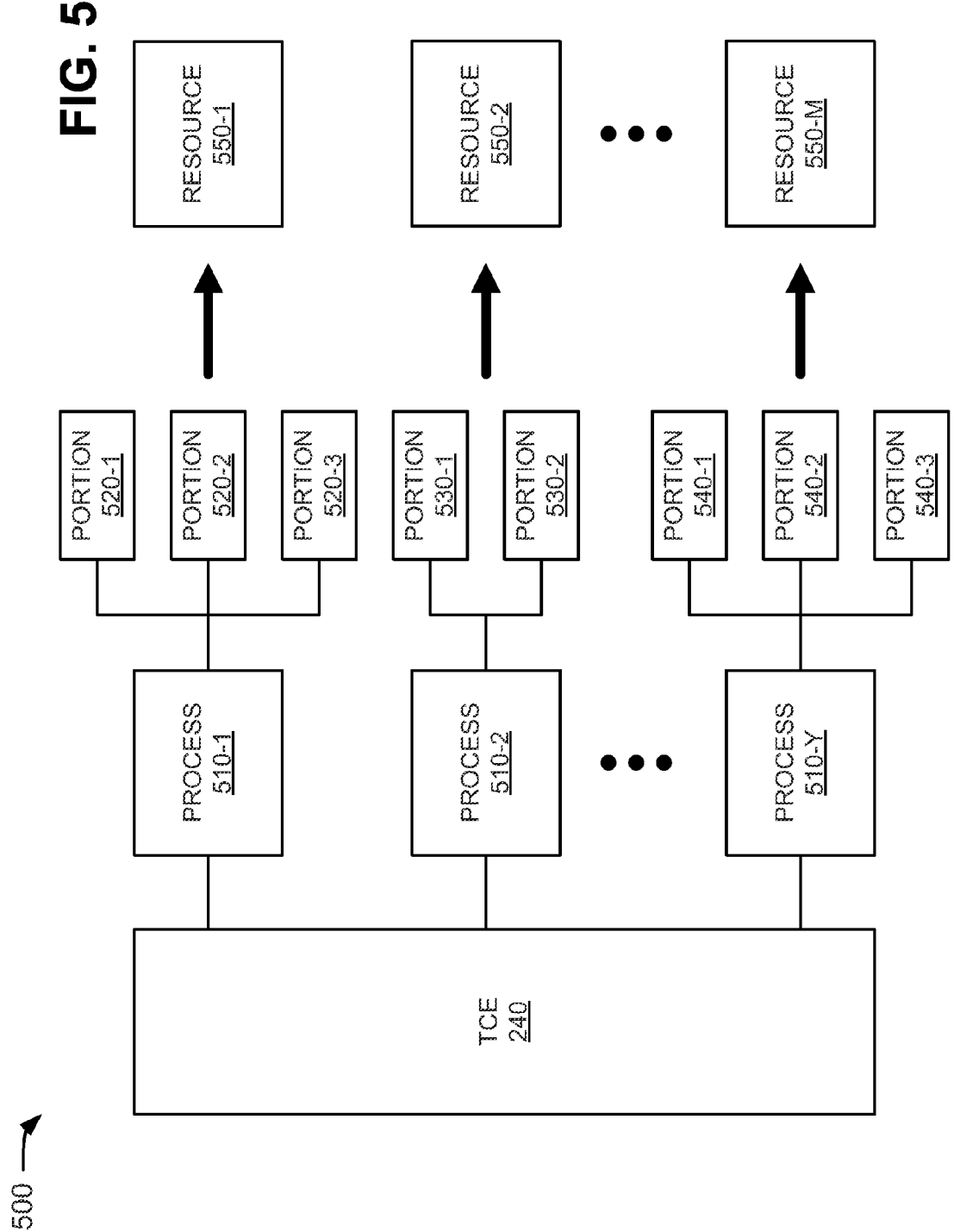
FIG. 5 is a diagram of example operations capable of being performed by the TCE.

FIG. 5 is a diagram of example operations capable of being performed by TCE 240. TCE 240 may include the features described above in connection with, for example, one or more of FIGS. 1-4. As illustrated in FIG. 5, TCE 240 may generate multiple processes 510-1 through 510-Y (collectively referred to herein as "processes 510," and, in some instances, singularly as "process 510") to be executed or handled. Each of processes 510 may include one or more portions to be executed or handled. For example, process 510-1 may include portions 520-1, 520-2, and 520-3 (collectively referred to herein as "portions 520"). Process 510-2 may include portions 530-1 and 530-2 (collectively referred to herein as "portions 530"). Process 510-Y may include portions 540-1, 540-2, and 540-3 (collectively referred to herein as "portions 540"). Portions 520-540 may be executed or handled by one or more of multiple resources 550-1 through 550-M (collectively referred to herein as "resources 550," and, in some instances, singularly as "resource 550").

Process 510 may include program code to be executed or handled by resources 550. In one example, process 510 may include processes generated by TCE 240. Each of portions 520 may include any division or sub-process of process 510-1, such as contiguous portions of process 510-1 and/or non-contiguous portions of process 510-1. Each of portions 530 may include any division or sub-process of process 510-2, such as contiguous portions of process 510-2 and/or non-contiguous portions of process 510-2. Each of portions 540 may include any division or sub-process of process 510-Y, such as contiguous portions of process 510-Y and/or non-contiguous portions of process 510-Y. In one example, each of portions 520-540 may include a thread or threads of program code.

Resource 550 may include a hardware resource or a software resource of a device or a group of devices (e.g., client device 210 and/or server device 220). For example, a hardware resource may include a memory device, a CPU, a GPU, a core of a CPU or GPU, etc. of a device. A software resource may include a socket, a thread, a semaphore, an IPC mechanism, etc.

Although FIG. 5 shows example operations capable of being performed by TCE 240, in other implementations, TCE 240 may perform fewer operations, different operations, and/or additional operations than depicted in FIG. 5. Alternatively, or additionally, one or more components of FIG. 5 may perform one or more other tasks described as being performed by one or more other components of FIG. 5.

Figure 6:
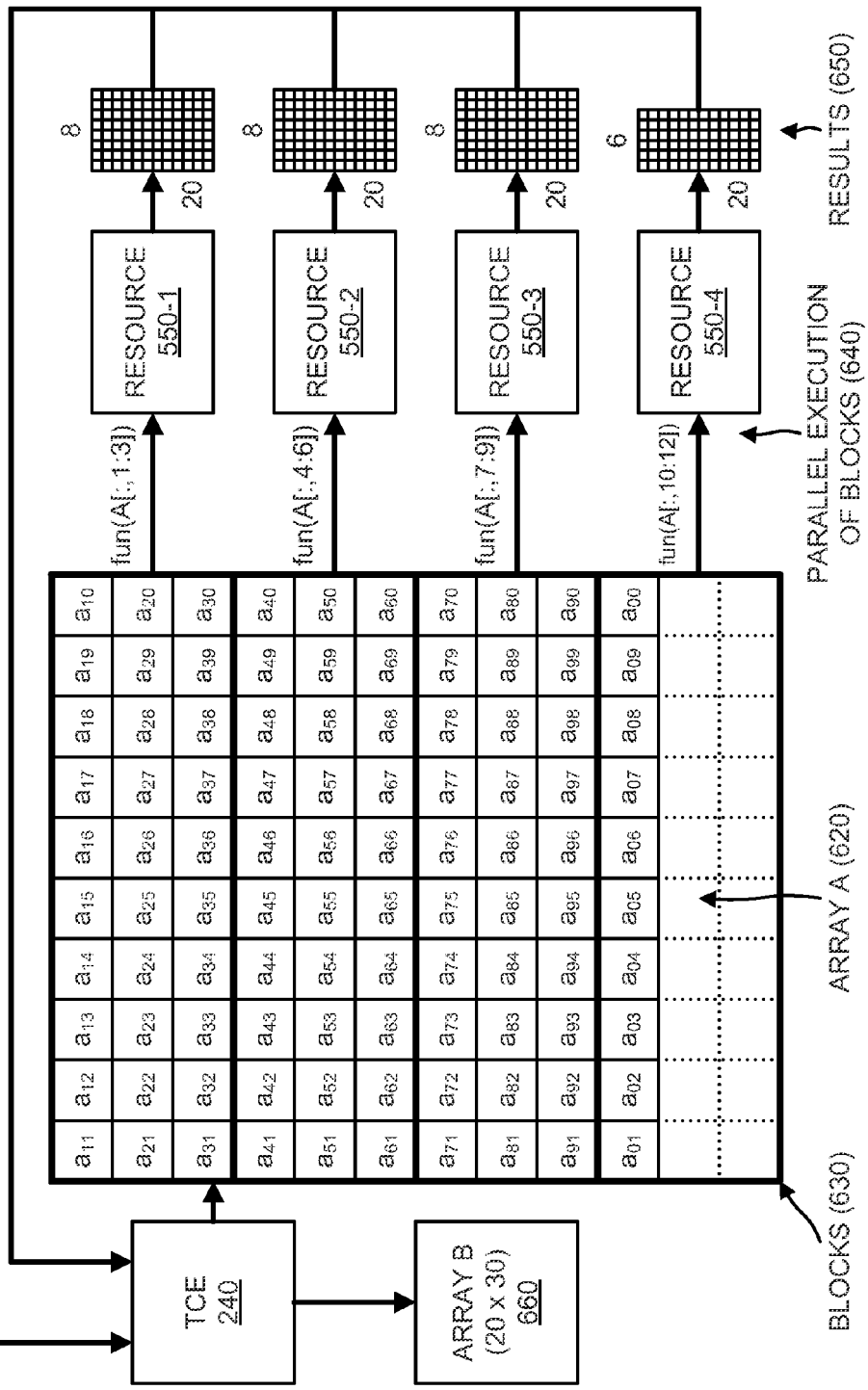
FIG. 6 is a diagram of example array partitioning operations capable of being performed by the TCE.

FIG. 6 is a diagram of example array partitioning operations 600 capable of being performed by TCE 240 and resources 550. TCE 240 and resources 550 may include the features described above in connection with, for example, one or more of FIGS. 1-5. As shown in FIG. 6, TCE 240 may receive a command 610 to initiate parallel processing, such as a slicefun command. The slicefun command may be utilized when a user wants to process all pages of an array A as follows:

for p=1:size(A, 3)

B(:, :, p)=fun(A(:, :, p));

end.

Although very explicit, this code may not lend itself well to parallel execution since the loop over p is executed serially, one page of the array A is extracted at a time, a function fun is executed on the page, and a result is placed into a page of an array B. Furthermore, one page of the array A may be associated with a single resource 550 so the for loop may only benefit from the single resource 550. For example, the array A may be distributed between multiple resources 550, but the pages of the array A may be stored entirely within one particular resource 550. In such a situation, for a given value of p, only the particular resource 550 would perform the calculations of fun(A(:, :, p)).

The slicefun command may replace the code described above, and may process slices or blocks of the array A. Each of the blocks may represent a subset of the array A, and may include data of the array A that is physically moved in memory or to another device. Alternatively, each of the blocks may include a set of pointers to the data of the array A, where the data remains in the same memory location. In one example, the syntax B=slicefun(fun, A) may invoke the function fun on each block of the array A, and may place the result in an array B. The array A may be sliced or divided along a last non-singleton dimension of the array A. If a user wants to divide the array A along a particular dimension, other than the last non-singleton dimension, the user may specify a Dim argument (e.g., B=slicefun(fun, A, 'Dim', d)). The Dim argument may cause the array A to be divided along a dimension d. For example, if the array A is a three-dimensional array, the syntax B=slicefun(fun, A, 'Dim', 2) may be equivalent to:

for j=1:size(A, 2)

B(:,j, :)=fun(A(:,j, :));

end.

In one example, the syntax slicefun(fun, A, 'Dim', d) may effectively include block processing the array A using blocks that are of size one for dimension d and of size size(A, k) for dimensions k that are not equal to dimension d.

The slicefun command may accept an argument (e.g., BlockSize) that specifies a block size: B=slicefun(fun, A, 'Dim', d, 'BlockSize', b). The parameter b may be a scalar that denotes the block size that is used, and may have a default value of one. The array A may be processed b blocks at a time. For example, if the array A is a three-dimensional array, the syntax B=slicefun(fun, A, 'Dim', 2, 'BlockSize', 2) may be equivalent to:

for j=1:2size(A, 2)

B(:,j:j+1, :)=fun(A(:,j:j+1, :));

end.

The slicefun command may accept multiple inputs and outputs. The syntax [B1, B2, . . . ]=slicefun(fun, A1, A2, . . . ) may invoke the function fun on each block of arrays A1, A2, . . . , and may place the outputs of the function fun into arrays B1, B2, . . . . For example, if arrays A1 and A2 are three-dimensional and have the same size, the syntax [B1, B2, B3]=slicefun(fun, A1, A2, 'Dim', 1) may be equivalent to:

for i=1:size(A1, 1)

[B1(i,:,:), B2(i,:,:), B3 (i,:,:)]=fun(A1(i,:,:), A2 (i,:,:));

end.

Singleton dimension expansion may enable the slicefun command to allow for inputs that do not have the same size. For example, for the syntax [B1, B2, . . . ]=slicefun(fun, A1, A2, . . . ), each dimension of arrays A1, A2, . . . must either be equal to each other, or equal to one. Whenever a dimension of one of the input arrays is a singleton in the slicing dimension, the entire array may be passed into the function fun, rather than just a block of the array. If arrays A1, A2, . . . are not all of the same size, an aggregate size of the input arrays may be defined as follows: (1) a number of dimensions may be a maximum number of dimensions of arrays A1, A2, . . . ; and (2) a size in dimension k may be a maximum of the sizes of arrays A1, A2, . . . in dimension k. For example, if array A1 is three-dimensional and array A2 is scalar, the aggregate size of the input arrays may be the same as the size of array A1, and the syntax B=slicefun(fun, A1, A2, 'Dim', 1) may be equivalent to:

for i=1:size(A1, 1)

B(i,:,:)=fun(A1(i,:,:), A2);

end.

In another example, if array A1 is a 10-by-1 array, and array A2 is a 1-by-10 array, then the aggregate size of the input arrays may be 10-by-10, and the syntax B=slicefun(fun, A1, A2, 'Dim', 2) may be equivalent to:

for i=1:size(A2, 2) % Here, size(A2, 2) is same as length (A2)

B(:,i)=fun(A1, A2(:, i)); % Here, A2(:,i) is same as A2(i)

end.

The slicefun command may permit overlap between blocks. The syntax B=slicefun(fun, A, 'Overlap', o) may invoke the function fun on each block of array A, but may pass o+1 blocks to the function fun each time. For example, if array A is three-dimensional, the syntax B=slicefun(fun, A, 'Dim', 2, 'Overlap', 2) may be equivalent to:

for j=1:size(A, 2)

B(:,j,:)=fun(A(:,j:j+2, :));

end.

A default value of the overlap may be set zero (i.e., no overlap).

The slicefun command may permit padding of inputs (e.g., adding columns and/or rows to an array). For example, if array A1 is a 5-by-10 array and a user wants to process array A1 along the columns of array A1, three columns at a time, and array A2 is a 5-by-1 array, the slicefun command may invoke the function fun on:

A1(:, 1:3) and A2;

A1(:, 4:6) and A2;

A1(:, 7:9) and A2; and

A1(:, 10) padded to have three columns and A2.

Thus, array A1 may be padded so that its number of columns is a multiple of three, and array A2 may not be padded.

As a default, sizes of the outputs of the slicefun command may match an aggregate size of the inputs. The slicefun command may also enable the function fun to return a scalar as the output of processing a block of its inputs. In the syntax [B1, B2, . . . ]=slicefun(fun, A1, A2, . . . , 'Output', outputdescr), outputdescr may be a cell array {od1, . . . , odm} of the same length as a number of outputs B1, B2, . . . , Bm. Each element of the cell array may be either a string (e.g., 'slice' or 'scalar') or a size vector. If the output descriptor odk for an array Bk is set to 'slice', then the array Bk may be the same size as an aggregate size of input arrays in all dimensions except d, and the size of array Bk may be equal to a number of blocks. If the output descriptor odk for the array Bk is set to 'scalar', then the array Bk may be a row vector with a length equal to the number of blocks. If the output descriptor odk for the array Bk is a size vector, then length(odk) may be greater than or equal to the slicing dimension, and the size of the array Bk may be equal to odk. For example, if A is a matrix, the syntax [B1, B2]=slicefun(fun, A, 'Output' {'slice', 'scalar'}, 'Dim', 1) may be equivalent to:

for i=1:size(A, 1)
        [B1(i,:), B2(i)]=fun(A(i,:));
    end.

In another example, A may be a 10-by-10 array and the syntax B=slicefun(fun, A, 'Dim', 2, 'Output', {[20, 30]}) may be executed. In this example, an array B may be a 20-by-30 array, and since array A may be processed in 10 blocks, each call to the function fun may yield a 10-by-3 array that the slicefun command may combine to form array B.

As further shown in FIG. 6, command 610 may include a dimension ('Dim') parameter with a value of one, and a block size ('Blocksize') parameter with a value of three. Thus, command 610 may specify that array A 620 is to be divided along a first dimension with a block size of three. Furthermore, command 610 may specify an output ('Output') parameter with a value of {[20, 30]}, which may indicate that the output (e.g., array B) is to be a 20-by-30 array. It may be assumed, for this example, that array A 620 is a 10-by-10 two-dimensional array.

TCE 240 may determine that each resource 550 is to process one block of array A 620. Therefore, TCE 240 may determine that array A 620 is to be divided into four blocks 630, where each block 630 may include three rows of array A 620. However, since array A includes ten rows, TCE 240 may pad array A with two rows to generate array A 620 with two extra rows. The extra rows may be empty (i.e., may not contain data). Each block 630 may be provided to a separate resource 550 in parallel. A first block 630 may be provided to resource 550-1 to process rows 1 to 3 of array A 620, a second block 630 may be provided to resource 550-2 to process rows 4 to 6 of array A 620, a third block 630 may be provided to resource 550-3 to process rows 7 to 9 of array A 620, and a fourth block 630 may be provided to resource 550-4 to process row 10 of array A 620. Resources 550 may execute the first through fourth blocks 630 in parallel, as indicated by reference number 640, to produce results 650.

In order for the output parameter (e.g., {[20, 30]}) to be satisfied, the function fun may need to yield a 20-by-8 array based on execution of the first block 630, a 20-by-8 array based on execution of the second block 630, a 20-by-8 array based on execution of the third block 630, and a 20-by-6 array based on execution of the fourth block 630. In one example, TCE 240 may perform a check to determine whether these conditions are satisfied prior to dividing array A 620 into blocks 630. The resulting arrays of results 650 may be provided to TCE 240, and TCE 240 may combine results 650 into a single result, such as a 20-by-30 array B 660. In one example, TCE 240 may concatenate arrays of results 650 to generate array B 660. TCE 240 may store and/or output array B 660.

Although FIG. 6 shows example operations capable of being performed by TCE 240, in other implementations, TCE 240 may perform fewer operations, different operations, and/or additional operations than depicted in FIG. 6. Alternatively, or additionally, one or more components of FIG. 6 may perform one or more other tasks described as being performed by one or more other components of FIG. 6.

Figure 7:
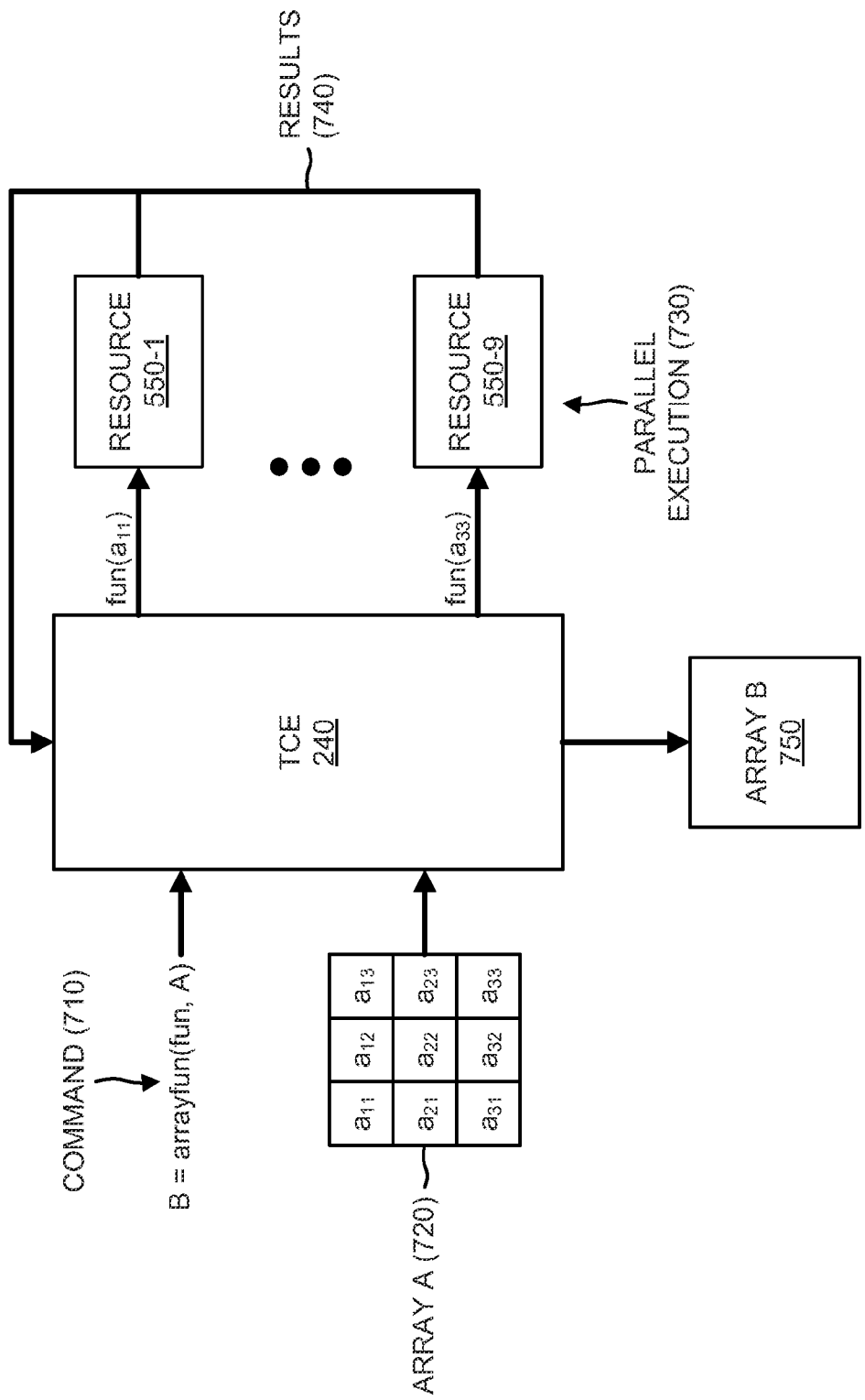
FIG. 7 is a diagram of example array extension operations capable of being performed by the TCE.

FIG. 7 is a diagram of example array extension operations 700 capable of being performed by TCE 240 and resources 550. TCE 240 and resources 550 may include the features described above in connection with, for example, one or more of FIGS. 1-6. As shown in FIG. 7, TCE 240 may receive a command 710 to initiate parallel processing, such as an arrayfun command. In one example, for the syntax B=arrayfun (fun, A), the arrayfun command may invoke a function fun once for each element of an array A, and may return the results to an array B. For the syntax A=arrayfun(fun, S, T, . . . ), the arrayfun command may evaluate the function fun using elements of arrays S, T, . . . as input arguments, where the input arguments may be the same size. The arrayfun command may also accept name-value pairs for the input arguments.

The arrayfun command may support multiple inputs and outputs. For example, the syntax [B1, B2, . . . ]=arrayfun(fun, A1, A2, . . . ), if input arrays A1, A2, . . . are the same size, may invoke the function fun once for each element of the input arrays, and may place the results into output arrays B1, B2, . . . . The arrayfun command may support inputs that do not have the same size. For the syntax [B1, B2, . . . ]=arrayfun (fun, A1, A2, . . . ), each dimension of the input arrays A1, A2, . . . may either be equal to each other, or equal to one. Whenever a dimension of an input array or an output array is a singleton (equal to one), the array may be virtually replicated along the dimension to match the other array. For example, if A is an array, then the syntax B=arrayfun(fun, A) may be equivalent to:

for i=1:numel(A)
        B(i)=fun(A(i));
    end
    B=reshape(B, size(A)).

In another example, if A1 is a matrix and A2 is a row vector, the syntax B=arrayfun(fun, A1, A2) may be equivalent to:

for j=1:size(A, 2)
        for i=1:size(A, 1)
            B(i,j)=fun(A1(i,j), A2(j));
        end
    end.

As further shown in FIG. 7, command 710, in this example, may include the syntax B=arrayfun(fun, A), where fun is a function to be executed on an input array A and B is an output array. TCE 240 may receive an array A 720 along with command 710. In this example, array A 720 may be a 3-by-3 array with nine elements (e.g., $a_{11}$, . . . , $a_{33}$). Based on command 710, TCE 240 may invoke the function fun once for each element of array A 720, with singleton dimension expansion. For example, TCE 240 may invoke the function fun for element $a_{11}$, element $a_{12}$, . . . , element $a_{33}$, and may provide the invocations of the function fun to resources 550. TCE 240 may provide the invocation of the function fun for element $a_{11}$ to resource 550-1, may provide the invocation of the function fun for element $a_{12}$ to resource 550-2, etc.

Resources 550 may execute, in parallel, the invocations of the function fun for the elements of array A 720, as indicated by reference number 730. The execution of the function fun by resources 550 may generate nine results 740 (e.g., one result 740 for each element of array A 720). In one example, each result 740 may include an element of an output array. Resources 550 may provide results 740 to TCE 240, and TCE 240 may receive results 740. TCE 240 may combine results 740 into a single result (e.g., an array B 750), and may store and/or output array B 750.

The arrayfun command may execute more quickly on both CPUs and on GPUs than corresponding for-loop code. For example, a for-loop may perform indexing to evaluate a function on all elements in an array as follows:

```
for i=1:numel(A)
    B(i)=fun(A(i));
end
B=reshape(B, size(A)).
```

Since there may be no restrictions on the content of the function fun, the for-loop may need to support the possibility that the function fun could modify array A. This, in turn, may require the indexing operations, inside the for-loop, to be bounds-checked.

In contrast, the arrayfun command (e.g., B=arrayfun(fun, A)) may loop over the elements of array A and may invoke the function fun on each element. However, since the function fun may be transparent, the arrayfun command may ensure that the array A remains constant during the looping. Furthermore, since the arrayfun command performs the looping over the elements of the array A, all of the indexing into the array A may be within bounds and may not need to be bounds-checked. Consequently, the arrayfun command may execute faster than the corresponding user-written for-loop.

The arrayfun command may map directly to a GPU in a straightforward manner. For example, the arrayfun command may create one thread for each element of an array A, and a thread i may execute B(i)=fun(A(i)). There are alternative mappings that may be used between the elements of the array A and the threads of execution. For example, if the size of the array A is m and n in first and second dimensions, respectively, and p is a product of the sizes of the array A in other dimensions, the arrayfun command can use a total of m×n threads and enumerate the threads by two-dimensional indices (i,j), where i and j are integers, $1 \leq i \leq m$, and $1 \leq j \leq n$. Thread (i,j) may process p elements of the array A, namely the elements $A(i, j, 1), \ldots, A(i, j, p)$.

The singleton dimension expansion of the arrayfun command may be utilized to improve execution performance on GPUs. For example, assume that a, b, and c are vectors, that they are aligned along first, second, and third dimensions, respectively, and that the following equation is to be calculated: D=arrayfun(fun, a, b, c). If we let m, n, and p denote a number of elements in a, b, and c, respectively, then array D may be an m-by-n-by-p array.

In one example, if the arrayfun command launches m×n×p threads and has threads (i, j, k) calculate D(i, j, k)=fun(a(i), b(j), c(k)) independently of all other threads, then each thread may read three elements from memory and write one element to memory. This may lead to a total of 3×m×n×p elements read and m×n×p elements written, for a total of 4×m×n×p read-write (RW) operations. Thus, there may be 4 RW operations for each output element calculated. This example may not adequately take any advantage of the singleton dimension expansion.

Alternatively, in a more refined approach, the arrayfun command may read a, b, and c once each, leading to a total of m+n+p elements read, and may write all m×n×p elements of the array D. Since GPUs may have a limited amount of data cache, the number of reads performed may be modified by the arrayfun command. For example, the arrayfun command may only need to perform (m×n×p+m+n+p) RW operations for m×n×p output elements. If m=n=p=32, a ratio of 1.0029 RW operations may be provided for each output element. As m, n, and p increase, this ratio may approach one from above.

To simplify the more refined approach, it may be assumed that m, n, and p are integer multiples of thirty-two (32). The arrayfun command may launch a total of m×n×p/128 threads, and may have each thread calculate D(i, j, k)=fun(a(i), b(j), c(k)) for 128 different choices of i, j, and k. The arrayfun command may group the threads into blocks of 256 threads, and may have the threads in each block cooperate to perform these calculations for 32 elements of i, 32 elements of j, and 32 elements of k. Thus, the 256 threads may compute 32×32×32=32,768 elements (e.g., where each thread computes 32,768/256=128 elements). The threads computing the 32,768 elements of the array D may write those elements to memory. However, the threads computing the 32,768 elements may only need to read 32 elements of a, 32 elements of b, and 32 elements of c (e.g., a total of 96 elements). The arrayfun command may read the elements of a, b, and c once into a shared memory on the GPU, where they can be accessed by all threads in a thread block.

The combined effect of the more refined approach is that it may only perform 32,768+96 RW operations in order to compute 32,768 elements. This may provide a ratio of 1.0029 RW operations for each output element, independent of the values of m, n, and p. As an example of the more refined approach, it may be assumed that a, b, and c are all of length 64. The arrayfun command may launch 8 thread blocks with 256 threads in each block. Each thread may process 128 elements. The different thread blocks may take responsibility for the different 32-by-32-by-32 cubes of the problem.

FIG. 8 is a table 800 depicting a solution generated by the arrayfun command in accordance with this example. As shown, table 800 may include a thread block field 810, an elements read in a field 820, an elements read in b field 830, an elements read in c field 840, an elements written to in D field 850, and multiple entries 860 associated with fields 810-850. In other implementations, table 800 may include less information, different information, additional information, and/or differently arranged information.

Thread block field 810 may include a number associated with one of the launched eight thread blocks. Elements read in a field 820 may include the elements read into vector a, such as elements 1:32 for thread blocks 1, 3, 5, and 7. Elements read in b field 830 may include the elements read into vector b, such as elements 1:32 for thread blocks 1, 2, 5, and 6. Elements read in c field 840 may include the elements read into vector c, such as elements 1:32 for thread blocks 1-4. Elements written to in D field 850 may include the elements written in array D, such as elements 1:32, 1:32, and 1:32 for thread block 1.

Although FIG. 7 shows example operations capable of being performed by TCE 240, in other implementations, TCE 240 may perform fewer operations, different operations, and/or additional operations than depicted in FIG. 7. Alternatively, or additionally, one or more components of FIG. 7 may perform one or more other tasks described as being performed by one or more other components of FIG. 7.

Figure 9:
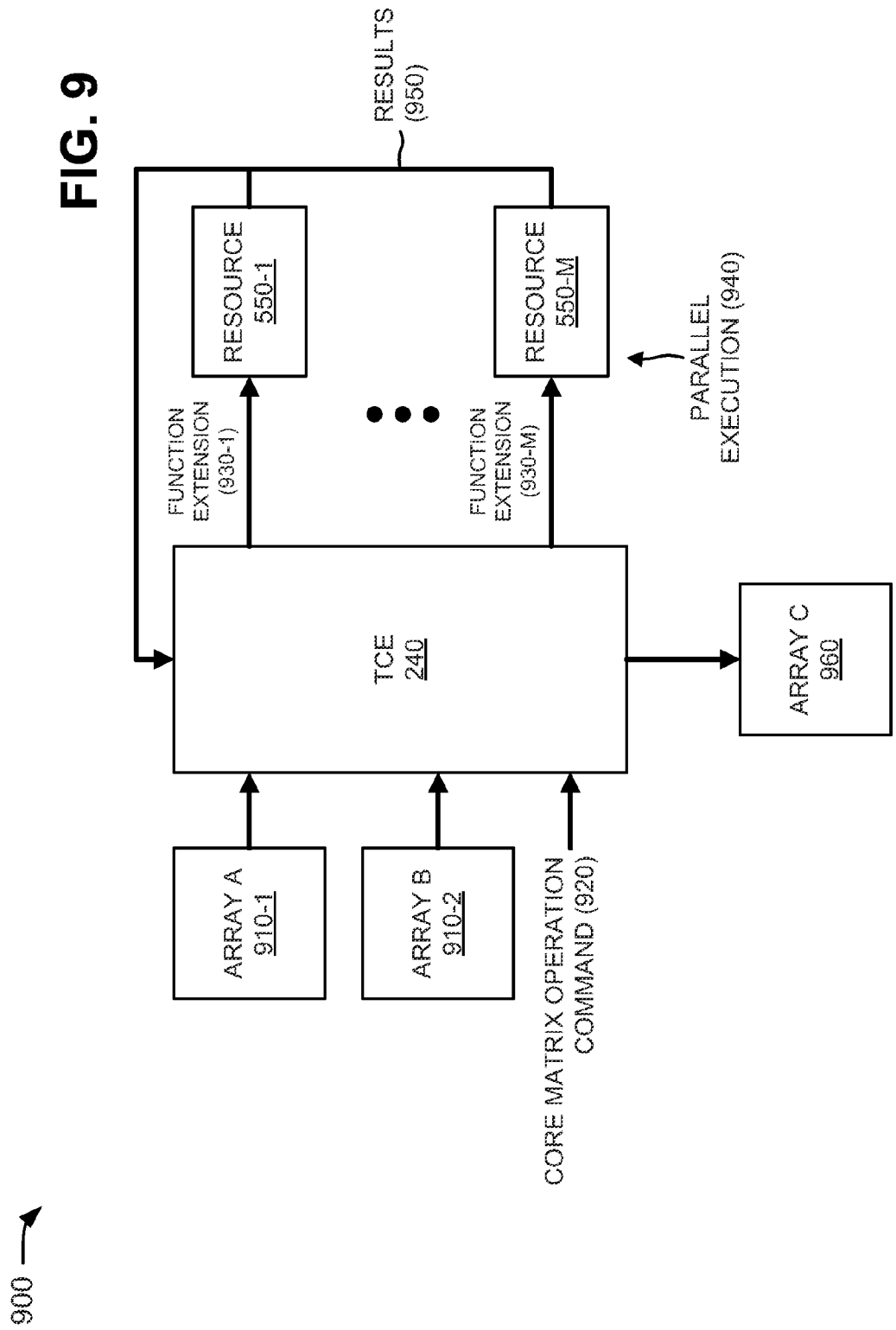
FIG. 9 is a diagram of example core matrix operations capable of being performed by the TCE.

FIG. 9 is a diagram of example core matrix operations 900 capable of being performed by TCE 240 and resources 550. TCE 240 and resources 550 may include the features described above in connection with, for example, one or more of FIGS. 1-8. As shown in FIG. 9, TCE 240 may receive an array A 910-1, an array B 910-2, and a command 920 to initiate parallel processing. Each of array A 910-1 and array B 910-2 may include an N-dimensional (N-D) array. Command 920 may include a core matrix operation that operates on matrices and/or N-D arrays. The core matrix operation may include a function to perform a Cholesky factorization (chol), a function to calculate an eigenvalue or an eigenvector (eig), a function to perform a LU factorization (lu), a function to perform an orthogonal-triangular decomposition (qr), a function to perform a singular value decomposition (svd), a function to perform matrix multiplication (mtimes), a function to solve linear systems of equations (mldivide), etc.

Using the chol function as an example, typical code would loop over all pages of an array (A) and extract each page to perform the Cholesky factorization as follows:

for k=1:size(A,3)
  L(:,:,k)=chol(A(:, :, k));
end.

In contrast, command 920 may call the chol function, and may have the chol function loop over all pages of array A and perform the Cholesky factorization on each of the pages using the following syntax: L=chol(A). Command 920 may remove indexing operations and the for-loop from the code, which may make the code easier to read. Furthermore, command 920 may enable the core matrix operation to be processed in parallel.

The core matrix operations (e.g., chol, eig, lu, qr, svd, mtimes, and mldivide) may have well-defined behavior for scalar, vector, and matrix inputs, and command 920 may use those behaviors to extend the core matrix operations to support N-D array inputs. For example, it may be assumed that a function fun denotes any one of the core matrix operations, and that the syntax [C1, . . . , Cm]=fun(A, B, flag1, flag2, . . . ) is well defined when A and B are matrices. If A and B are N-D arrays whose sizes match, command 920 may define the syntax [C1, . . . , Cm]=fun(A, B, flag1, flag2, . . . ) to be the same as:

--- n = ndims(A);
for i_3 = size(A, 3)
  ...
    for i_n = size(A, n)
      [C1(:,:,i_3,...,i_n), ..., Cm(:,:,i_3,...,i_n)] = ...
        fun(A(:,:,i_3,...,i_n), B(:,:,i_3, ...,i_n), flag1, flag2, ...);
    end
  ...
end.

---

As further shown in FIG. 9, based on command 920, TCE 240 may extend the function fun to support multiple N-D array inputs, as indicated by reference numbers 930-1 through 930-M. TCE 240 may control application of the function fun to array A 910-1 and/or array B 910-2 so that the function fun is executed in parallel on portions of array A 910-1 and/or array B 910-2 by resources 550, as indicated by reference number 940. Resources 550 may concurrently execute the function fun on the portions of array A 910-1 and/or array B 910-2 to generate results 950. In one example, each of results 950 may include a portion of an output array. Resources 550 may provide results 950 to TCE 240, and TCE 240 may receive results 950. TCE 240 may combine results 950 into a single result (e.g., an array C 960), and may store and/or output array C 960.

Figure 10:
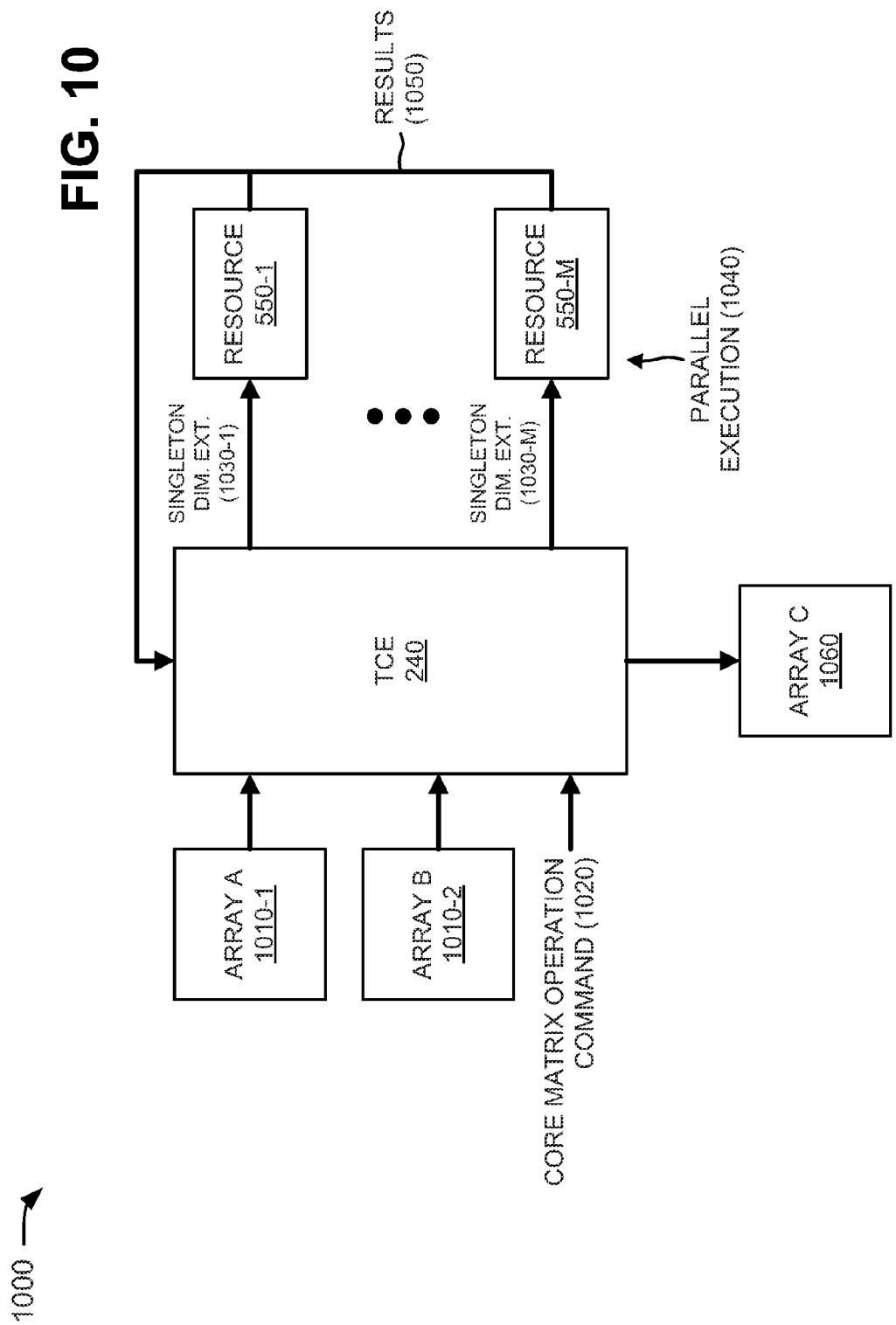
FIG. 10 is a diagram of further example core matrix operations capable of being performed by the TCE.

FIG. 10 is a diagram of further example core matrix operations 1000 capable of being performed by TCE 240 and resources 550. TCE 240 and resources 550 may include the features described above in connection with, for example, one or more of FIGS. 1-9. As shown in FIG. 10, TCE 240 may receive an array A 1010-1, an array B 1010-2, and a command 1020 to initiate parallel processing. Each of array A 1010-1 and array B 1010-2 may include an N-D array. Command 1020 may include a core matrix operation (e.g., chol, eig, lu, qr, svd, mtimes, and mldivide) that operates on matrices and/or N-D arrays.

The core matrix operations (e.g., chol, eig, lu, qr, svd, mtimes, and mldivide) may have well-defined behavior for scalar, vector, and matrix inputs, and command 1020 may use those behaviors to extend the core matrix operations to support singleton dimension expansion. For example, it may be assumed that a function fun denotes any one of the core matrix operations, and that the syntax [C1, . . . , Cm]=fun(A, B, flag1, flag2, . . . ) is well defined when A and B are matrices. If A and B are N-D arrays such that in all dimensions their sizes match in a particular dimension or one of them is of size 1 in the particular dimension, command 1020 may define the syntax [C1, . . . , Cm]=fun(A, B, flag1, flag2, . . . ) to be the same as:

--- n = max(ndims(A), ndims(B));
for i_3 = max(size(A, 3), size(B, 3))
  iA_3 = i_3;
  iB_3 = i_3;
  if size((A, 3) == 1)
    iA_3 = 1; % Singleton dimension expansion of A in dimension 3.
  end
  if size((B, 3) ==1)
    iB_3 = 1; % Singleton dimension expansion of B in dimension 3.
  end
  ...
    for i_n = max(size(A, n), size(B, n))
      iA_n = i_n;
      iB_n = i_n;
      if size((A, n) ==1)
        iA_n = 1; % Singleton dimension expansion of A in dim n.
      end
      if size((B, n) ==1)
        iB_n = 1; % Singleton dimension expansion of B in dim n.
      end
      [C1(:,:,i_3,...,i_n), ..., Cm(:,:,i_3,...,i_n)] = ...
        fun(A(:,:,iA_3,...,iA_n), B(:,:,iB_3, ...,iB_n), flag1, flag2, ...);
    end
  ...
end.

---

As further shown in FIG. 10, based on command 1020, TCE 240 may extend the function fun to support singleton dimension expansion, as indicated by reference numbers 1030-1 through 1030-M. TCE 240 may control application of the function fun to array A 1010-1 and/or array B 1010-2 so that the function fun is executed in parallel on portions of array A 1010-1 and/or array B 1010-2 by resources 550, as indicated by reference number 1040. Resources 550 may concurrently execute the function fun on the portions of array A 1010-1 and/or array B 1010-2 to generate results 1050. In one example, each of results 1050 may include a portion of an output array. Resources 550 may provide results 1050 to TCE 240, and TCE 240 may receive results 1050. TCE 240 may combine results 1050 into a single result (e.g., an array C 1060), and may store and/or output array C 1060.

Expressing multiple linear algebra operations in a single line of code, such as commands 920 and 1020, may have a major impact on the efficiency of the code. For example, removing the for-loop from the code may enable a function (e.g., a core matrix operation) to be easily executed in parallel. Removing all indexing operations from the code may increase execution speeds since the indexing operations do not have to be error checked or actually executed. Also, by removing the indexing operations from the code, a significant number of temporaries and copy operations may be avoided. Furthermore, supporting singleton dimension expansion may reduce an amount of memory required for performing computations. This reduction may lead to performance benefits as less data may be transferred between memory and CPU or GPU cores, and the resulting calculations may benefit more from processor data caches.

In one example, command 920/1020 may include the syntax L=chol(A), where a size of array A is 16-by-16-by-10000.

Since there would be 10,000 Cholesky factorizations of 16-by-16 matrices to be performed, TCE 240 may wish to perform the factorizations in parallel. TCE 240 may examine a size of array A and may determine a size of the resulting array L. For example, for a matrix of size n-by-n, the chol function may return a matrix of the same size. Therefore, the size of the pages of array L may equal the size of the pages of array A. Since there is only one input to the function chol, TCE 240 need not utilize singleton dimension expansion, and each page of array A may yield exactly one page of array L. Therefore, array L may have the same number of pages as array A, and the size of array L may be the same as the size of array A. TCE 240 may pre-allocate the size of array L to be 16-by-16-by-1000.

On shared memory architectures, all of the data associated with array A and array L may be stored in memory that can be addressed by all of the resources performing the computations. If Aptr and Lptr are double pointers in C++ that store data for array A and array L, respectively, a p-th page of array A may be stored in 256 elements starting at the addresses of Aptr[p×16×16] and Lptr[P×16×16]. Therefore, the function chol in C++ may read from and write to pages A(:,:,k) and L(:, :, k) directly without requiring any temporaries or unnecessary copying of data. Such an arrangement may be used with resources, such as a single CPU with one or more cores; multiple CPUs, each with one or more cores, that use the same address space; a single GPU; multiple GPUs when they use shared or virtual shared memory; etc.

If a Cholesky factorization is to be applied to n-by-n matrices that take, as input, a page size n, and pointers to the input and the output matrices are matrix_cholesky(size_t n, double const * const in, double * const out), an N-D Cholesky factorization of n-by-n-by-p arrays may be implemented, in parallel for all k in 1, . . . , p, as:

call matrix_cholesky(n, &Aptr[n*n*k], &Lptr[n*n*k]).

If the page size n is sufficiently large that there is benefit from performing the Cholesky factorization of the pages in parallel, TCE 240 may perform the Cholesky factorization in parallel. This may occur when an input array does not have very many pages but each page is relatively large (e.g., if array A is of size 512-by-512-by-4).

There may be a number of options for performing the multiple linear algebra operations on a GPU. As described above, an N-D Cholesky factorization of n-by-n-by-p arrays may be implemented, in parallel for all k in 1, . . . , p, as:

call matrix_cholesky(n, &Aptr[n*n*k], &Lptr[n*n*k]).

The statement "for all k in 1, . . . , p" may be executed as a literal loop on a CPU or as a function call from the CPU to a GPU that has an implicit "for all" built into it. If the routine matrix_cholesky is designed to be executed in its entirety in one step on the GPU, there may be multiple ways in which that could take place. For example, a routine may be written to use exactly one thread for each value of k. Each thread may work on a k-th factorization independently or each thread may collaborate with other threads on the factorization. In this case, the CPU may launch one kernel with a total of p threads. The "for all k" in the code may be handled by a GPU kernel launch system. Such an arrangement may be particularly advantageous when the page size n is very small and p is large, such as for linear algebra operations on one million 2-by-2 matrices. Alternatively, or additionally, a routine may be written to use one block of threads for each value of k. In this case, the CPU may launch one kernel with a total of p blocks of threads. The "for all k" in the code may be handled by the GPU kernel launch system. This arrangement may be advantageous when the page size n is intermediate in size, such as when n is in a range of 16 to 256.

Alternatively, or additionally, a routine may be written to launch one kernel for each value of k. In this case, the CPU may launch p kernels. The kernels may be independent of one another, and the GPU may execute all of the values of k independently of one another. This arrangement may be advantageous when the page size n is sufficiently large that the linear algebra operation on a single page offers sufficient parallelism to utilize the entire GPU, such as when n is greater than a threshold, such as 256.

If the routine matrix_cholesky is designed to execute partly on a CPU and partly on a GPU, it may be beneficial to use multiple threads on the CPU to execute the "for all k" in the code. This may lead to one or more kernel launches for each value of k. Another possibility may be to implement pagewise operations by calling specialized library functions that are built for performing multiple linear algebra operations concurrently on the GPU.

When performing linear algebra on distributed arrays, TCE 240 may perform the following steps. If a number of pages is equal to or larger than a number of resources, TCE 240 may instruct the resources to perform the linear algebra operation independently of one another. If necessary, TCE 240 may redistribute the input arrays so that for each page in the output array, at least one resource has all the pages of the input arrays that are involved in the computations for that output array. This may ensure that each resource can perform its computations independently of the other resources. Thus, the resources' N-D linear algebra operations may follow the steps described above for shared memory architectures and the execution on CPUs and GPUs.

If the number of pages is smaller than the number of resources, TCE 240 may instruct the resources to collaborate to perform the linear algebra operations. For each page in the output array, the resources may collectively compute the result as if this were written as a serial for loop, except that the resource may set up a workspace and other temporary variables once for all of the pages that are to be computed. The resources may also use offsets into the input and output arrays when performing the operations rather than performing copies to extract and insert input and output data.

In one example implementation, TCE 240 may utilize the following syntax to calculate a singleton dimension expansion of two input arrays (A and B).

```
% Show how the arrays A and B would be expanded via singleton
% dimension expansion and how each page of the output array
% would be derived from a page in A and a page in B.
   nd = max([ndims(A), ndims(B)]);
   Asize = zeros(1, nd);
   Bsize = zeros(1, nd);
   %Csize = zeros(1, nd);
   for dim = 1:nd
      Asize(dim) = size(A, dim);
      Bsize(dim) = size(B, dim);
   end
   maxSize = max([Asize; Bsize]);
   numPagesOut= prod(maxSize(3:end));
   fprintf('Output has %d pages\n', numPagesOut);
   for k = 1:numPagesOut
      outputIndex = ones(1, nd);
      outputIndex(1:2) = NaN;% We will never use these
      r = k - 1;
      for dim = 3:nd
         if r > 0
            outputIndex (dim) = rem(r, maxSize(dim)) + 1;
            r = floor(r/maxSize(dim));
         end
      end
      Aindex = min([outputIndex ; Asize]);
      Bindex = min([outputIndex ; Bsize]);
```

```
          fprintf('page = %d is Output(%s), calculated from A(%s) and
          B(%s)\n', ...
              k, printIndex(outputIndex), printIndex(Aindex),
              printIndex(Bindex));
          end
      end
      function str = printIndex(index)
      % Translate an index of the form [a, b, c, d] into
      % the string ':, :, c, d'.
          nd = length(index);
          c = cellfun(@num2str, num2cell(index), 'UniformOutput', false);
          c(1:2) = {':'};
          d = cat(1, c, [repmat({','}, 1, nd – 1), {''}]);
          str = [d{:}];
      end.
```

Executing this syntax for input arrays of size 3-by-3-by-4-by-1 and 3-by-3-by-1-by-3, may generate eight pages: page=1 is Output(:,:,1,1), calculated from A(:,:,1,1) and B(:,:,1,1); page=2 is Output(:,:,2,1), calculated from A(:,:,2,1) and B(:,:,1,1); page=3 is Output(:,:,3,1), calculated from A(:,:,3,1) and B(:,:,1,1); page=4 is Output(:,:,4,1), calculated from A(:,:,4,1) and B(:,:,1,1); page=5 is Output(:,:,1,2), calculated from A(:,:,1,1) and B(:,:,1,2); page=6 is Output(:,:,2,2), calculated from A(:,:,2,1) and B(:,:,1,2); page=7 is Output(:,:,3,2), calculated from A(:,:,3,1) and B(:,:,1,2); and page=8 is Output(:,:,4,2), calculated from A(:,:,4,1) and B(:,:,1,2).

Although FIGS. 9 and 10 show example operations capable of being performed by TCE 240, in other implementations, TCE 240 may perform fewer operations, different operations, and/or additional operations than depicted in FIGS. 9 and 10. Alternatively, or additionally, one or more components of FIGS. 9 and 10 may perform one or more other tasks described as being performed by one or more other components of FIGS. 9 and 10.

Example Processes

Figure 11:
FIG. 11 is a flow chart of an example process for partitioning and parallel processing of a multidimensional array.

FIG. 11 is a flow chart of an example process 1100 for partitioning and parallel processing of a multidimensional array. In one implementation, process 1100 may be performed by client device 210/TCE 240. Alternatively, or additionally, process 1100 may be performed by another device or a group of devices separate from or including client device 210/TCE 240.

As shown in FIG. 11, process 1100 may include receiving a command to initiate parallel processing, the command including a function, an array, and dimension(s) by which to partition the array (block 1110), and partitioning the array along the dimension(s) to create multiple blocks of the array (block 1120). For example, in an implementation described above in connection with FIG. 6, TCE 240 may receive command 610 to initiate parallel processing, such as a slicefun command. Command 610 may include a dimension ('Dim') parameter with a value of one, and a block size ('Blocksize') parameter with a value of three. Thus, command 610 may specify that array A 620 is to be divided along a first dimension with a block size of three. Furthermore, command 610 may specify an output ('Output') parameter with a value of {[20, 30]}, which may indicate that the output (e.g., array B 660) is to be a 20-by-30 array. TCE 240 may determine that each resource 550 is to process one block of array A 620. Therefore, TCE 240 may determine that array A 620 is to be divided into four blocks 630, where each block 630 may include three rows of array A 620. However, since array A includes ten rows, TCE 240 may pad array A with two rows to generate array A 620 with two extra rows. The extra rows may be empty (i.e., may not contain data).

As further shown in FIG. 11, process 1100 may include controlling application of the function to the multiple blocks to cause the function to execute in parallel on at least two of the blocks (block 1130). For example, in an implementation described above in connection with FIG. 6, each block 630 may be provided to a separate resource 550 in parallel. A first block 630 may be provided to resource 550-1 to process rows 1 to 3 of array A 620, a second block 630 may be provided to resource 550-2 to process rows 4 to 6 of array A 620, a third block 630 may be provided to resource 550-3 to process rows 7 to 9 of array A 620, and a fourth block 630 may be provided to resource 550-4 to process row 10 of array A 620.

Returning to FIG. 11, process 1100 may include receiving results of the parallel execution of the at least two blocks (block 1140), combining the results into a single result (block 1150), and outputting and/or storing the single result (block 1160). For example, in an implementation described above in connection with FIG. 6, resources 550 may execute the first through fourth blocks 630 in parallel, as indicated by reference number 640, to produce results 650. In order for the output parameter (e.g., {[20, 30]}) to be satisfied, the function fun may need to yield a 20-by-8 array based on execution of the first block 630, a 20-by-8 array based on execution of the second block 630, a 20-by-8 array based on execution of the third block 630, and a 20-by-6 array based on execution of the fourth block 630. The resulting arrays of results 650 may be provided to TCE 240, and TCE 240 may combine results 650 into a single result, such as a 20-by-30 array B 660. In one example, TCE 240 may concatenate arrays of results 650 to generate array B 660. TCE 240 may store and/or output array B 660.

FIG. 12 is a flow chart of an example process 1200 for parallel processing elements of a multidimensional array. In one implementation, process 1200 may be performed by client device 210/TCE 240. Alternatively, or additionally, process 1200 may be performed by another device or a group of devices separate from or including client device 210/TCE 240.

As shown in FIG. 12, process 1200 may include receiving a command to initiate parallel processing, the command including a function and an array with multiple elements (block 1210), and invoking the function once for each element of the array with singleton dimension expansion (block 1220). For example, in an implementation described above in connection with FIG. 7, TCE 240 may receive command 710 to initiate parallel processing, such as an arrayfun command. In one example, for the syntax B=arrayfun(fun, A), the arrayfun command may invoke a function fun once for each element of an array A, with singleton dimension expansion, and may return the results to an array B.

As further shown in FIG. 12, process 1200 may include controlling application of the function to the multiple elements to cause the function to execute in parallel on at least two of the elements (block 1230). For example, in an implementation described above in connection with FIG. 7, TCE 240 may invoke the function fun for element $a_{11}$, element $a_{12}$, ..., element $a_{33}$, and may provide the invocations of the function fun to resources 550. TCE 240 may provide the invocation of the function fun for element $a_{11}$ to resource 550-1, may provide the invocation of the function fun for element $a_{12}$ to resource 550-2, etc. Resources 550 may execute, in parallel, the invocations of the function fun for the elements of array A 720, as indicated by reference number 730.

Returning to FIG. 12, process 1200 may include receiving results of the parallel execution of the at least two elements (block 1240), combining the results into a single result (block 1250), and outputting and/or storing the single result (block 1260). For example, in an implementation described above in connection with FIG. 7, the execution of the function fun by resources 550 may generate nine results 740 (e.g., one result 740 for each element of array A 720). In one example, each result 740 may include an element of an output array. Resources 550 may provide results 740 to TCE 240, and TCE 240 may receive results 740. TCE 240 may combine results 740 into a single result (e.g., output array B 750), and may store and/or output array B 750.

FIG. 13 is a flow chart of an example process 1300 for parallel processing of a multidimensional array using core matrix operations. In one implementation, process 1300 may be performed by client device 210/TCE 240. Alternatively, or additionally, process 1300 may be performed by another device or a group of devices separate from or including client device 210/TCE 240.

As shown in FIG. 13, process 1300 may include receiving a command to initiate parallel processing, the command including a core matrix operation function and an N-D array (block 1310), and extending the function to support multiple N-D array inputs and/or singleton dimension expansion (block 1320). For example, in an implementation described above in connection with FIGS. 9 and 10, TCE 240 may receive array A 910-1, array B 910-2, and command 920 to initiate parallel processing. Each of array A 910-1 and array B 910-2 may include an N-D array. Command 920 may include a core matrix operation that operates on matrices and/or N-D arrays. The core matrix operation may include a function to perform a Cholesky factorization (chol), a function to calculate an eigenvalue or an eigenvector (eig), a function to perform a LU factorization (lu), etc. Based on command 920, TCE 240 may extend the function fun to support multiple N-D array inputs, as indicated by reference numbers 930-1 through 930-M. Based on command 1020, TCE 240 may extend the function fun to support singleton dimension expansion, as indicated by reference numbers 1030-1 through 1030-M.

As further shown in FIG. 13, process 1300 may include controlling application of the function to the N-D array to cause the function to execute in parallel on at least two portions of the N-D array (block 1330). For example, in an implementation described above in connection with FIG. 9, TCE 240 may control application of the function fun to array A 910-1 and/or array B 910-2 so that the function fun is executed in parallel on portions of array A 910-1 and/or array B 910-2 by resources 550, as indicated by reference number 940. Resources 550 may concurrently execute the function fun on the portions of array A 910-1 and/or array B 910-2 to generate results 950. In one example, each of results 950 may include a portion of an output array.

Returning to FIG. 13, process 1300 may include receiving results of the parallel execution of the at least two portions of the N-D array (block 1340), combining the results into a single result (block 1350), and outputting and/or storing the single result (block 1360). For example, in an implementation described above in connection with FIG. 9, resources 550 may provide results 950 to TCE 240, and TCE 240 may receive results 950. TCE 240 may combine results 950 into a single result (e.g., an array C 960), and may store and/or output array C 960.

CONCLUSION

Systems and/or methods described herein may enable a TCE to re-write code so that operations with small vectors and/or matrices may be executed concurrently. This may enable the TCE to perform multi-threaded or parallel execution of the operations.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 11-13, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
one or more processors to:
receive a command to initiate parallel processing,
the command including:
an indication of a function that is to be performed in connection with the parallel processing, and
a reference to a multidimensional array to which the function is to be applied,
the multidimensional array including at least three dimensions;
determine whether the command includes an argument indicating one or more dimensions, of the at least three dimensions, by which the multidimensional array is to be partitioned;
selectively partition, based on determining whether the command includes the argument, the multidimensional array, along the one or more dimensions or along a last non-singleton dimension of the at least three dimensions, to divide the multidimensional array into a plurality of blocks, the multidimensional array being partitioned along the one or more dimensions when the command includes the argument, the multidimensional array being partitioned along the last non-singleton dimension when the command does not include the argument, and each of the plurality of blocks representing a subset of the multidimensional array; and control application of the function to the plurality of blocks to cause the function to be applied in parallel to at least two blocks of the plurality of blocks.

2. The device of claim 1, where the command further includes a reference to a second array and, when partitioning the multidimensional array, the one or more processors are further to:

perform singleton dimension expansion on the second array when a dimension of the second array is unequal to a dimension of the multidimensional array.

3. The device of claim 1, where, when determining whether the command includes the argument, the one or more processors are to:

determine that the command includes an indication of the one or more dimensions by which the multidimensional array is to be partitioned, where the indication is received as a default value, and set the indication of the one or more dimensions as the last non-singleton dimension of the multidimensional array.

4. The device of claim 1, where the command and the function are provided using a dynamically typed programming language.

5. The device of claim 1, where, when determining whether the command includes the argument, the one or more processors are to:

determine that the command includes an indication of all dimensions of the at least three dimensions, and where, when selectively partitioning the multidimensional array, the one or more processors are to:

partition the multidimensional array to cause each of the plurality of blocks to include a single element of the multidimensional array.

6. The device of claim 1, where, when controlling application of the function, the one or more processors are further to:

transmit the function or a reference to the function to a plurality of resources, transmit at least one different block of the plurality of blocks to each of the plurality of resources, receive results, from the plurality of resources, relating to the application of the function to the at least one different block of the plurality of blocks, and store the received results.

7. A method, comprising:

receiving a command to initiate parallel processing, the command including:

an indication of a function that is to be performed in connection with the parallel processing, a reference to a multidimensional array to which the function is to be applied, the multidimensional array including at least three dimensions, and the receiving being performed by a device;

determining whether the command includes an argument indicating one or more dimensions, of the at least three dimensions, by which the multidimensional array is to be partitioned, the determining being performed by the device;

selectively partitioning, based on the determining, the multidimensional array, along the one or more dimensions or along a last non-singleton dimension of the at least three dimensions, to divide the multidimensional array into a plurality of blocks, the multidimensional array being partitioned along the one or more dimensions when the command includes the argument, the multidimensional array being partitioned along the last non-singleton dimension when the command does not include the argument, each of the plurality of blocks representing a subset of the multidimensional array, and the selectively partitioning being performed by the device; and controlling application of the function to the plurality of blocks to cause the function to be applied in parallel to at least two blocks of the plurality of blocks, the controlling being performed by the device.

8. The method of claim 7, where the command further includes a reference to a second array, the method further comprising:

performing singleton dimension expansion on the second array when a dimension of the second array is unequal to a dimension of the multidimensional array.

9. The method of claim 7, where the determining includes:

determining that the command includes an indication of a default value by which the multidimensional array is to be partitioned, and determining to partition the multidimensional array along the last non-singleton dimension of the multidimensional array based on the command including the indication of the default value.

10. The method of claim 7, where the argument includes an indication of all dimensions of the multidimensional array, and where selectively partitioning the multidimensional array includes:

partitioning the multidimensional array to cause each of the plurality of blocks to include a single element of the multidimensional array.

11. The method of claim 7, where, when controlling application of the function, the method further comprises:

transmitting the function or a reference to the function to a plurality of resources;

transmitting at least one different block of the plurality of blocks to each of the plurality of resources;

receiving results, from the plurality of resources, relating to the application of the function to the at least one different block of the plurality of blocks;

combining the results into a single result; and storing the single result.

12. One or more non-transitory computer-readable media storing instructions, the instructions comprising:

one or more instructions that, when executed by a processor of a device, cause the processor to:

receive a command to initiate parallel processing, the command including:

an indication of a function that is to be performed in connection with the parallel processing, and a reference to a multidimensional array to which the function is to be applied, the multidimensional array including at least three dimensions;

determine whether the command includes an argument indicating one or more dimensions, of the at least three dimensions, by which the multidimensional array is to be partitioned;

selectively partition, based on determining whether the command includes the argument, the multidimensional array, along the one or more dimensions or along a non-singleton dimension of the at least three dimensions, to divide the multidimensional array into a plurality of blocks,
 each of the plurality of blocks representing a subset of the multidimensional array; and
control application of the function to the plurality of blocks to cause the function to be applied in parallel to at least two blocks of the plurality of blocks.

13. The one or more non-transitory computer-readable media of claim 12, where the command further includes a reference to a second array, and
where the one or more instructions to selectively partition the multidimensional array include:
 one or more instructions that, when executed by the processor, cause the processor to:
 perform singleton dimension expansion on the second array when a dimension of the second array is unequal to a dimension of the multidimensional array.

14. The one or more non-transitory computer-readable media of claim 12, where the command includes the argument and the argument includes an indication of all dimensions of the multidimensional array, and
where the one or more instructions to selectively partition the multidimensional array include:
 one or more instructions that, when executed by the processor, cause the processor to:
 partition the multidimensional array such that each of the plurality of blocks includes a single element of the multidimensional array.

15. The one or more non-transitory computer-readable media of claim 12, where the one or more instructions to control the application of the function include:
 one or more instructions that, when executed by the processor, cause the processor to:
 transmit the function or a reference to the function to a plurality of resources,
 transmit at least one different block of the plurality of blocks to each of the plurality of resources,
 receive results, from the plurality of resources, relating to the application of the function to the at least one different block of the plurality of blocks, and
 store the received results.

16. A device comprising:
one or more processors to:
 receive a command to initiate parallel processing,
 the command including:
 an indication of a function that is to be performed in connection with the parallel processing, and
 a reference to an array that includes a plurality of elements, the array including at least three dimensions;
 determine whether the command includes an argument indicating one or more dimensions, of the at least three dimensions, by which the array is to be partitioned;
 partition, based on determining whether the command includes the argument, the array along the one or more dimensions or along a non-singleton dimension of the array,
 the array being partitioned along the one or more dimensions when the command includes the argument, and
 the array being partitioned along the non-singleton dimension when the command does not include the argument;
 invoke the function for each element of the plurality of elements of the array, with singleton dimension expansion;
 control application of the function to the plurality of elements to cause the function to be executed in parallel on at least two elements of the plurality of elements;
 receive results of the parallel execution of the at least two elements of the plurality of elements;
 combine the results into a single result; and
 store the single result.

17. The device of claim 16, where, when controlling application of the function, the one or more processors are further to:
 transmit the function or a reference to the function to a plurality of resources,
 transmit a different element of the plurality of elements to each of the plurality of resources, and
 receive the results, from the plurality of resources, relating to the application of the function to the different elements of the plurality of elements.

18. The device of claim 16, where the function includes a core matrix operation function, and where the one or more processors are further to:
 extend the function to support a plurality of multidimensional array inputs and singleton dimension expansion.

19. A method, comprising:
receiving a command to initiate parallel processing,
 the command including:
 an indication of a function that is to be performed in connection with the parallel processing, and
 a reference to an array that includes a plurality of elements,
 the array including at least three dimensions, and
 the receiving the command being performed by a device;
 determining whether the command includes an argument indicating one or more dimensions, of the at least three dimensions, by which the array is to be partitioned,
 the determining being performed by the device;
 partition, based on the determining, the array along the one or more dimensions or along a last non-singleton dimension of the array,
 the partitioning being performed by the device,
 the array being partitioned along the one or more dimensions when the command includes the argument, and
 the array being partitioned along the last non-singleton dimension when the command does not include the argument;
invoking the function for each element, of the plurality of elements of the array, with singleton dimension expansion,
 the invoking being performed by the device;
controlling application of the function to the plurality of elements to cause the function to be executed in parallel on at least two elements of the plurality of elements,
 the controlling being performed by the device;
receiving results of the parallel execution of the at least two elements of the plurality of elements,
 the receiving the results being performed by the device;
combining the results into a single result,
 the combining being performed by the device; and
storing the single result in a memory associated with the device,
 the storing being performed by the device.

20. The method of claim 19, where the controlling the application of the function includes:
- transmitting the function or a reference to the function to a plurality of resources;
- transmitting a different element of the plurality of elements to each of the plurality of resources; and
- receiving the results, from the plurality of resources, relating to the application of the function to the different elements of the plurality of elements.

21. The method of claim 19, where, when the function includes a core matrix operation function, the method further comprises:
- extending the function to support a plurality of multidimensional array inputs and singleton dimension expansion.

* * * * *